(12) United States Patent
Callentine et al.

(10) Patent No.: US 7,525,265 B2
(45) Date of Patent: Apr. 28, 2009

(54) DRIVE MOTOR REVERSAL FOR A BARRIER OPERATOR OR THE LIKE

(75) Inventors: Donald R. Callentine, Plainfield, IL (US); Thomas J. Jankovsky, South Elgin, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 305 days.

(21) Appl. No.: 11/110,427

(22) Filed: Apr. 20, 2005

(65) Prior Publication Data

US 2007/0252545 A1 Nov. 1, 2007

(51) Int. Cl.
*H02P 3/26* (2006.01)
(52) U.S. Cl. ............... 318/280; 318/256; 318/739; 49/28; 49/6
(58) Field of Classification Search .......... 318/280, 318/256, 739; 49/6, 28
See application file for complete search history.

(56) References Cited

U.S. PATENT DOCUMENTS

| | | | |
|---|---|---|---|
| 3,725,757 A | 4/1973 | Ehrens et al. | |
| 4,045,715 A | 8/1977 | Umpleby et al. | |
| 4,128,791 A | 12/1978 | Katz | |
| 4,386,398 A | 5/1983 | Matsuoka et al. | |
| 4,794,268 A * | 12/1988 | Nakano et al. | 307/10.2 |
| 5,162,718 A | 11/1992 | Schroeder | |
| 5,278,480 A * | 1/1994 | Murray | 318/626 |
| 5,325,034 A | 6/1994 | Reynolds | |
| 5,404,088 A | 4/1995 | Nanos | |
| 5,414,334 A | 5/1995 | Cheron | |
| 5,625,175 A * | 4/1997 | Gutknecht et al. | 187/316 |
| 5,847,525 A | 12/1998 | Cheron et al. | |
| 5,925,996 A | 7/1999 | Murray | |
| 5,998,950 A | 12/1999 | Fitzgibbon et al. | |
| 6,025,785 A * | 2/2000 | Farris et al. | 340/5.23 |
| 6,118,243 A | 9/2000 | Reed et al. | |
| 6,172,475 B1 | 1/2001 | Fitzgibbon et al. | |
| 6,388,412 B1 | 5/2002 | Reed et al. | |
| 6,563,278 B2 * | 5/2003 | Roman | 318/282 |
| 6,879,122 B1 * | 4/2005 | Stewart et al. | 318/280 |
| 6,975,203 B2 * | 12/2005 | Brookbank et al. | 340/5.26 |
| 6,983,726 B1 * | 1/2006 | Luo et al. | 123/179.2 |
| 2003/0025470 A1 * | 2/2003 | Fitzgibbon et al. | 318/66 |
| 2003/0178957 A1 * | 9/2003 | Fitzgibbon et al. | 318/280 |
| 2005/0146298 A1 * | 7/2005 | Murray | 318/286 |

* cited by examiner

*Primary Examiner*—Rita Leykin
(74) *Attorney, Agent, or Firm*—Fitch Even Tabin & Flannery

(57) ABSTRACT

Methods and apparatus for reversing a drive motor for a barrier movement operator are disclosed. The operator senses the nature of a request for reversal and based on the nature of the sensed request performs one of a plurality of processes to reverse the motor.

12 Claims, 4 Drawing Sheets

DRIVE MOTOR REVERSAL FOR A BARRIER OPERATOR OR THE LIKE

BACKGROUND OF THE INVENTION

1. Field of the Invention

The present invention is related to movable barrier operators and more particularly, to the control of a motor for driving a movable barrier such as a garage door.

2. Background Description

Movable barrier operators and, more particularly, garage door operators are well known and have become very sophisticated to provide users with increased convenience and security. Such barrier movement operators may move barriers such as gates and garage doors which have a relatively large mass which brings into play a relatively large inertia. In order to overcome such inertia electric motors of significant power are used to move the barrier. Thus, a system exists in which an object of relatively large inertia is being powered by a motor of relatively large power. Barrier operator safety is achieved by providing a plurality of sensors to the operation of the barrier and a control method which stop or reverse barrier movement according to the condition sensed.

It is common for barrier operators to employ A.C. induction motors to power barrier movement. Such motors include some arrangement of switched start windings and/or switched capacitors to urge the motor into rotation in a selected direction. When a barrier is being moved in a first direction and a safety condition is sensed, known arrangements rapidly enable the starting of motor rotation to reverse direction of the barrier. Such enabling may be constant or it may be pulsed to first slow the barrier then cause it to reverse direction.

Reversing the direction of barrier movement by beginning a reverse motor starting process creates noise and vibration from the motor. The noise, by itself is an annoyance to those nearby while the vibration may shorten the life of the barrier and operator system. A need exists for improved methods and apparatus for reversing the direction of barrier travel in a barrier operator system.

The present invention provides a plurality of motor reversal algorithms and selects one of the algorithms for use depending on the type of reversal need sensed. The actual rotation speed of the motor may be sensed and be used to decide which algorithm to use and/or how a selected algorithm is to be employed. For example, when the sensed need indicates that the barrier may be contacting an obstruction, a relatively rapid reversal may be attempted. For protection of property and other reasons, the increased vibrations may be tolerated. The rapid reversal may be moderated by the sensed RPM during the reversal process. Also, for example, when a sensed reversal condition does not indicate actual contact (called non-contact) a second algorithm which allows a longer time to complete the reversal may be used. The second algorithm reduces the noise and harmful vibrations of immediate reversal and may also be moderated by sensed motor RPM during the reversal process.

BRIEF DESCRIPTION OF THE DRAWINGS

The foregoing and other objects, aspects and advantages will be better understood from the following detailed preferred embodiment description with reference to the drawings, in which.

DETAILED DESCRIPTION

Figure 1:
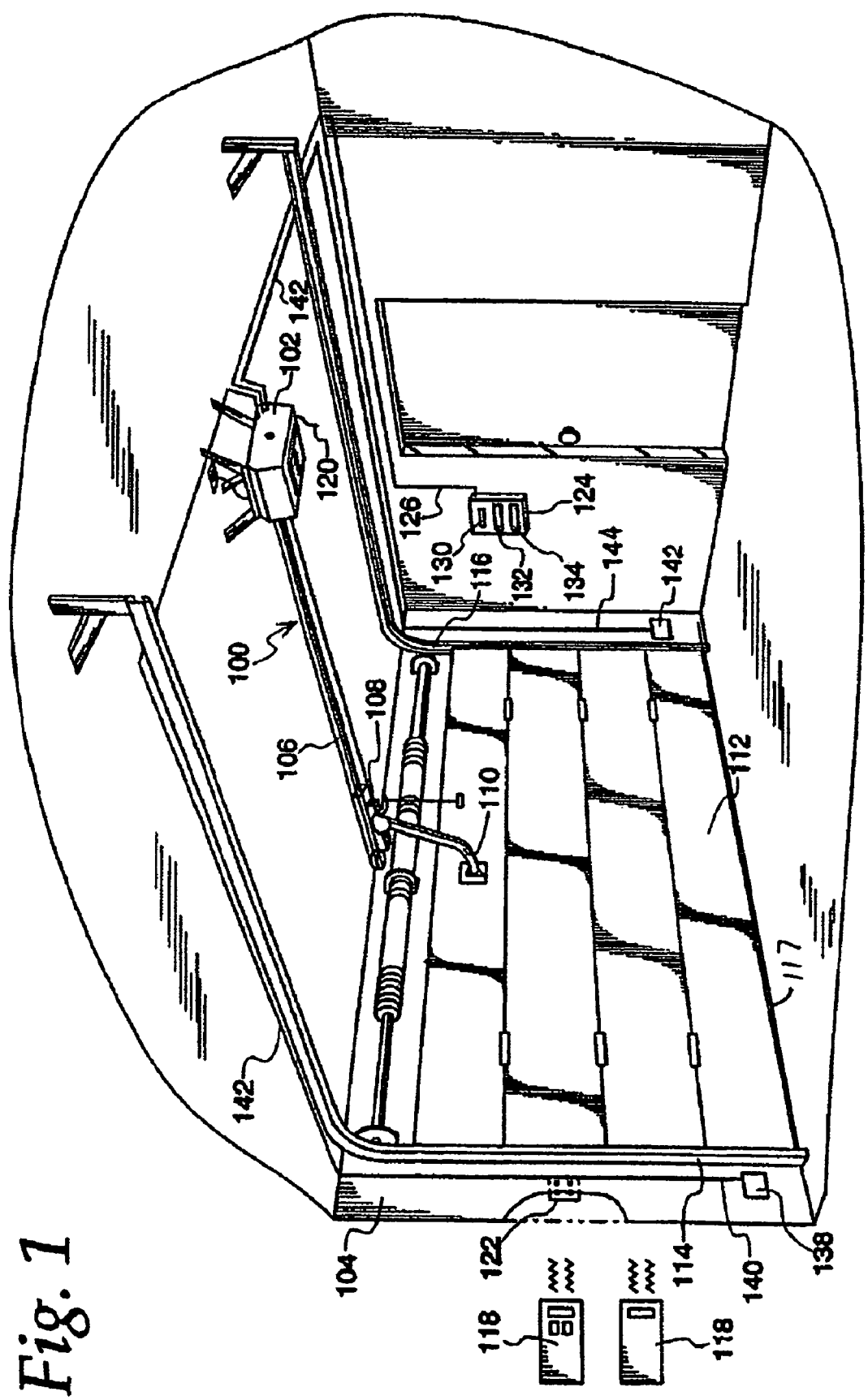
FIG. 1 illustrates a barrier movement operator connected to move a garage door.

Referring now to the drawings, and more particularly, FIG. 1 shows an example of a movable barrier operator or garage door operator (GDO) according to the present invention, generally referred to by numeral 100. The preferred GDO 100 includes a preferred embodiment drive motor 150 (FIG. 2) and a control circuit 208 (FIG. 2) controlling GDO operation in a head unit 102 that is mounted to the ceiling of a garage 104. A rail 106 extends from the head unit 102. A trolley 108 is releasably attached to the rail 106 and includes an arm 110 extending to a multiple paneled garage door 112 positioned for movement along a pair of door rails 114 and 116. The GDO system 100 includes at least one hand-held remote control transmitter unit 118 adapted to send signals to an antenna 120 on the head unit 102. Signals from the antenna 120 are provided to the control circuit in the head unit 102. An external remote control pad 122 is positioned on the outside of the garage and includes multiple buttons thereon for communicating via radio frequency transmission with the control circuit in the head unit 102. A wall switch module 124 is mounted on a wall of the garage. The wall switch module 124 is a wired remote control connected to the control circuit in the head unit 102 by a wire 126. The wall switch module 124 may include a light switch 130, a lock switch 132 and a command switch 134. An optical emitter 138, preferably emitting an infrared (IR) beam, is connected via a power and signal line 140 to the control circuit in the head unit 102. An optical detector 142, disposed opposite the optical emitter 138 and receiving the IR beam, also is connected by a wire 144 to the control circuit in the head unit 102. The optical transmitter/detector 138 and 142 serve to sense if an obstruction is present in the barrier opening. A door edge detector 117 is also deployed on the leading edge (bottom) of door 112 to detect contact of the door with an obstruction. Door edge detector 117 may communicate wirelessly with an edge detector receiver 231 of the barrier movement controller. As illustrated the barrier movement operator of FIG. 1 also includes a motion sensor 119 which communicates with the controller of the head end unit 102 via a path 121.

Controller 208 reviews the many inputs and identifies whether a moving barrier should be reversed. For example, the motion detector 119 may detect motion in the garage or the obstacle detector 214 may detect an obstacle in the door opening, signaling a possible unsafe condition if the door 112 is allowed to continue closing. These detected conditions are examples of non-contact conditions, in response to which the direction of travel of the door should be reversed. They are referred to as non-contact because although they raise safety concerns, there is no indication that the moving barrier has struck or contacted an obstruction. Other inputs to controller such as the tachometer 226 input and the door edge detector 231 input signals which are called contact conditions because they may represent actual contact of the moving barrier with an obstacle. The contact conditions may represent a more immediate safety concerns than non-contact conditions and different arrangements to those of non-contact conditions for barrier reversal are provided for them.

Figure 2:
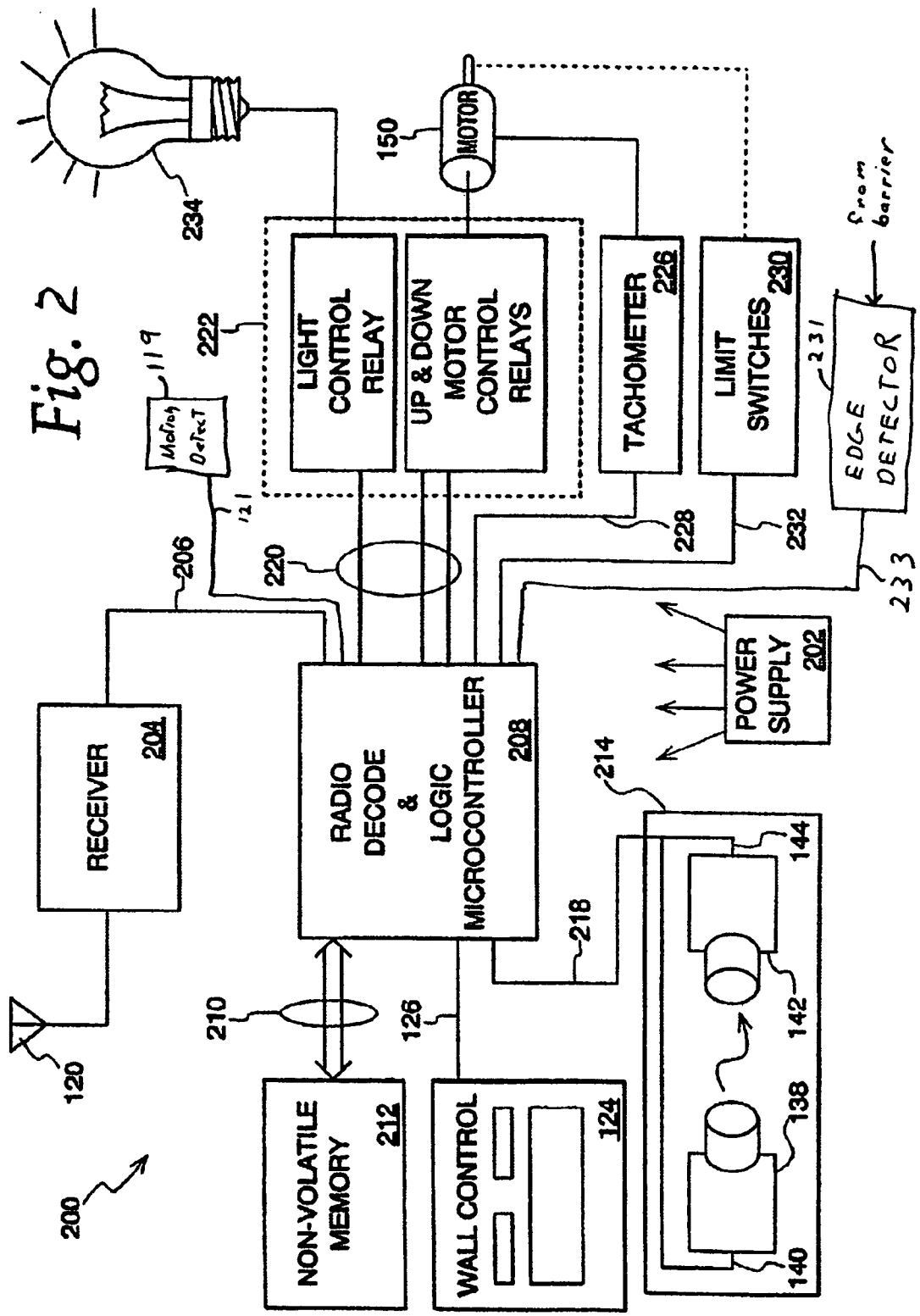
FIG. 2 is an example of a controller for a barrier movement operator.
Figure 3:
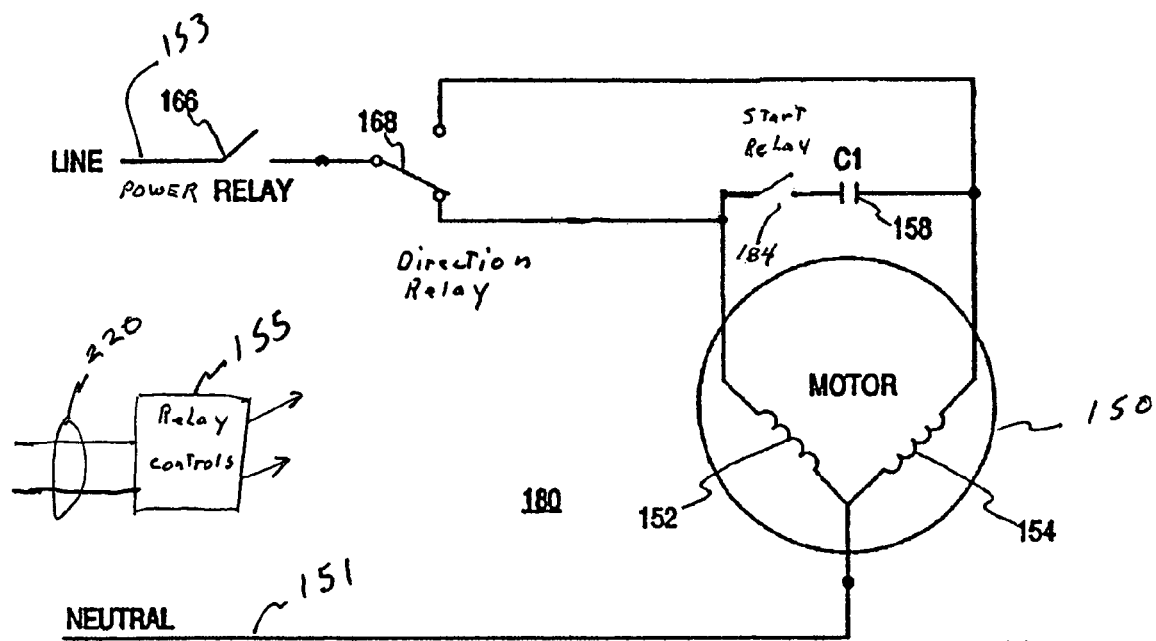
FIG. 3 shows a preferred embodiment of drive motor according to the present invention.

FIG. 2 is an example of a controller 200 controlling a drive motor 150 such as in FIG. 3. The controller 200 is powered by a power supply 202 that converts alternating current from a line alternating current source, such as 110 volt AC, to required levels of DC voltage. The controller 200 is mounted in the head unit, e.g., head unit 102 of FIG. 1, with antenna 120 attached to receiver 204 which is coupled via a line 206 to supply demodulated digital signals to a microcontroller 208. The microcontroller 208 is also coupled by a bus 210 to a non-volatile memory 212, which stores user codes, and other digital data related to the operation of the control unit 200. Emitter 138 and infrared detector 142 form an obstacle detector 214 and power and signal lines 140, 144 form an obstacle detector bus 218 connected to microcontroller 208. The obstacle detector bus 218 includes lines 140 and 144. The wall switch module 124 is connected via wire 126 to the microcontroller 208. The microcontroller 208, in response to switch closures and received codes, sends signals over a relay logic line 220 to a relay logic module 222 connected to drive motor 150 which has a power take-off shaft 216 from the rotor coupled to the transmission of the garage door operator 100 of FIG. 1. A tachometer 226 is coupled to the drive motor 150 and provides an RPM signal on a tachometer line 228 to the microcontroller 208; the tachometer signal provides an indication of the speed at which the door is being driven. The apparatus also includes up and down limit switches 230, respectively sensing when the door 112 is fully open or fully closed. The limit switches 230 are connected to microcontroller 208 by leads 232. A light 234 is controlled by microcontroller 208 through logic module 222. Edge detector receiver 231 detects contact of the barrier with an obstruction, as sensed by door edge 117, and communicates such with controller 208 via a bus 233. Similarly, motion detector 119 may detect motion in the garage and communicate such to controller 208.

FIG. 3 shows an embodiment of drive motor 150 which acts a switched capacitor start single phase motor the control for which comes from controller 208. The motor 150 includes two coils or windings 152, 154 in the stator. The common connection of the two windings 152 and 154 is connected to ground or a neutral reference voltage terminal 151 of common 110 VAC household line. Capacitor 158 connected across terminals at the opposite ends of the two windings 152, 154 by a start relay 184 the state of which is set by controller 208 acting through relay controls 155. Line current 153 is provided through a power relay 166 to a direction relay 168 which selectively passes line current directly to either side of capacitor 158 and one of windings 152, 154. In this embodiment providing line current to winding 152 drives the garage door operator in the up direction and providing line current to winding 154 drives the operator in the down direction.

When the garage door operator is activated to drive the door down, e.g., by pressing a button on a remote; the controller 208 acting through relay control 155 closes power relay 166 and controls direction relay 168 to connect line current to coil 154 at capacitor 158. To start the motor, relay 184 is closed and capacitor 158 passes a current out of phase with the line current to coil 152. As a result, the motor 150 drives the garage door down. In normal operation controller 208 opens relay 184 after a predetermined period of time. When the garage door operator is activated, again, the control circuit closes power relay 166 and direction relay 168 switches to connect power to coil 152. As before, relay 184 is closed for a predetermined period of time to start the motor 150.

Figure 4:
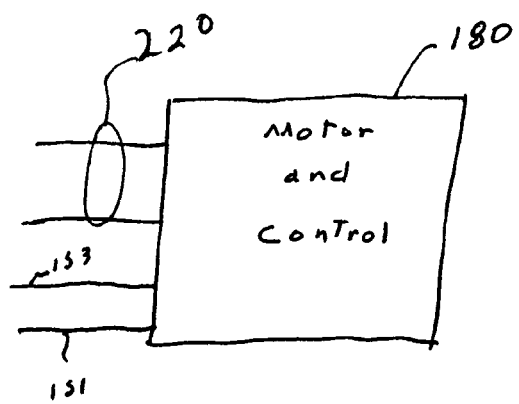
FIG. 4 is a generalized block diagram of a motor and motor control apparatus.

FIG. 3 represents the control of a switched capacitor induction motor. Different types of motors such as a permanent split capacitor, DC motor etc. may be employed to achieve similar movement of a barrier. FIG. 4 is a generalized block diagram representing that other types of A.C. induction motors may be employed provided that power and direction can selectively be controlled by controller 208 and that the start sequence may also be controlled by the controller.

Figure 5:
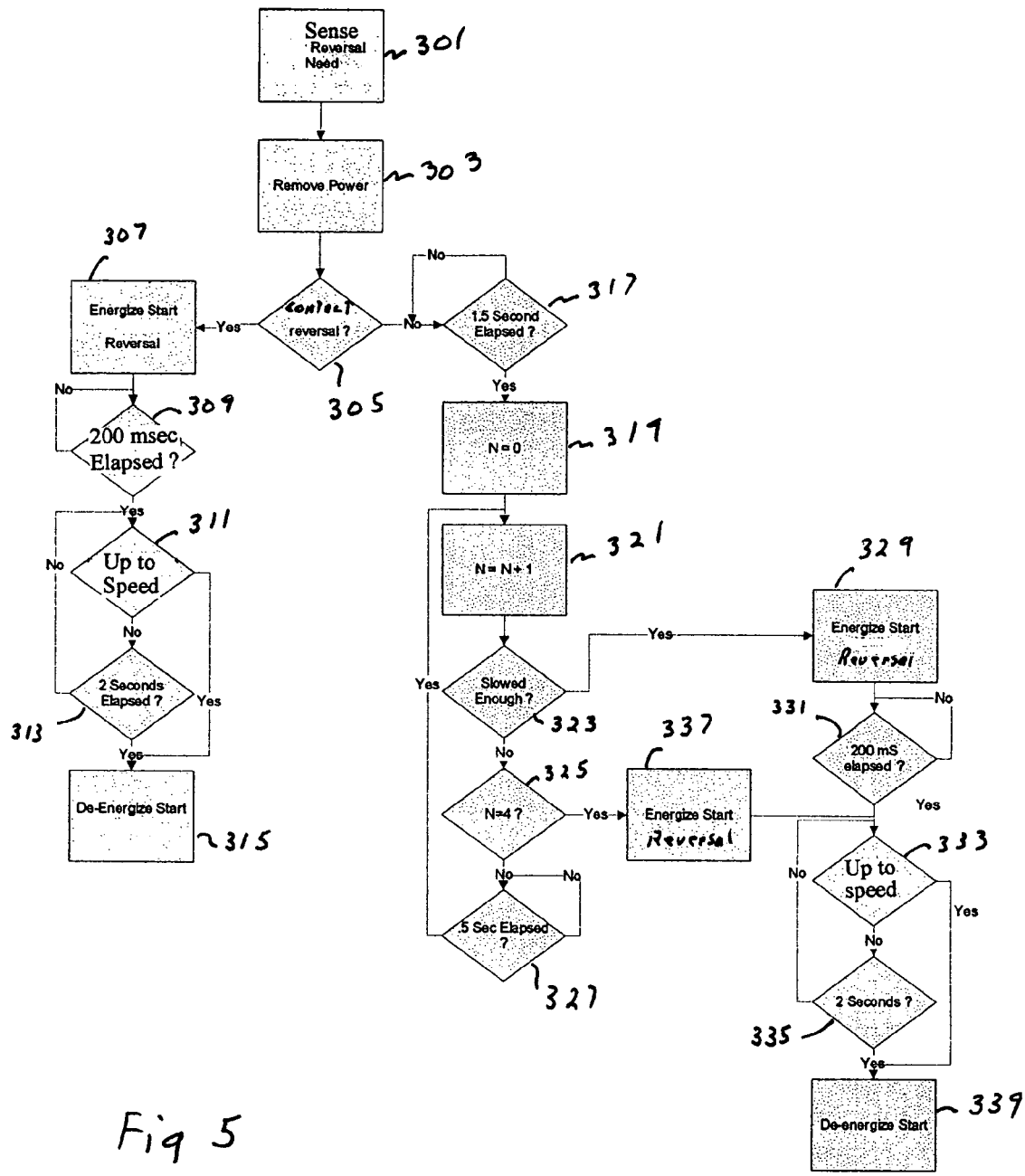
FIG. 5 is a flow diagram of the processes of control for motor reversal.

During operation, the reversal of direction of barrier travel may be needed. The present system comprises different control algorithms for door reversal depending upon the type of reversal sensed by controller. FIG. 5 is a flow diagram representing a plurality of door reversal algorithms. A primary distinguishing characteristic for selecting which algorithm to use is whether the triggering, sensed condition is of a contact type or a non-contact type. Although FIG. 5 shows two distinct lines of flow it is possible that other implementations may include other lines of flow with different time delays based on different sensed conditions.

The motor reversal flow begins at a block 301 when controller 208 senses that a reversal is needed. Next, a block 303 is performed in which power is removed such as by opening relay 166 (FIG. 3). A decision block 305, is then performed to determine whether the sensed reversal condition is of a contact type or a non-contact type. When a contact type reversal is sensed, some urgency is implemented in reversing the barrier. Alternatively, when a non-contact type reversal is sensed less urgency in reversal is required and flow proceeds to a block 317 where a 1.5 second delay period is provided before moving to blocks 319 and 321 to set up a loop transition counter by setting a variable N to 1. Next, a decision 323 is performed to determine whether the unpowered motor as slowed to a predetermined amount or less. The predetermined speed for block 323 may be, for example, 50% of operation speed. When sufficient slowing is detected, flow proceeds to a block 329 where a start sequence for the reverse direction is begun. In terms of the example of FIG. 3 the start sequence begins with the setting of relay 168 to the appropriate direction and the closing of power relay 166 and start relay 184. After beginning the start sequence, a delay of 200 msec is implemented by block 331 and a check 333 is performed to see whether the motor has achieved a predetermined rate in the newly desired direction. The predetermined speed for block 333 may be, for example, 33% of operating speed. If such has been achieved, the start sequence is terminated at block 339 by opening start relay 184.

When block 333 indicates that sufficient speed in the new direction (e.g., 339 of operator speed) has not been achieved a conditional two second delay period is implemented by block 335. During the two second delay period the motor speed is periodically checked to see if sufficient speed, 33% of operating speed, in the new direction. At the end of the two second delay period or when sufficient speed has been achieved the start relay 184 is opened.

When step 323 determines that the motor has not slowed sufficiently (e.g., 50% of operating speed), a loop consisting of blocks 321,323,325 and 327 is traversed to provide a maximum further delay of 1.5 seconds during which motor speed is checked at 0.5 second intervals. If the motor has not slowed sufficiently during the 1.5 second interval block 325 sends the flow to block 337 in which the start sequence is begun. Steps 333,335 and 339 are then performed as described above.

When block 305 determines that a contact type reversal need has been sensed reversal is performed with somewhat greater urgency. In this algorithm sequence a block 307 is performed to energize a start sequence for the reversed direction. Next, a 200 msec delay is inserted by operation of block 309. Thereafter, a conditional two second delay period is performed by blocks 311 and 313. During this two second delay the motor speed is frequently checked. The start sequence will be ended by a block 315 whenever the motor has achieved a predetermined speed e.g., 33% of operating speed, in the new direction or the full two seconds have elapsed.

The preceding examples show the operation of the present system for motor reversal. It should be recognized that although the examples are in terms of relay control of the motor, other types of control such as by triac could be employed. Further, other types of induction motors may be employed without departing from the scope of the invention.

What is claimed is:

1. A method for reversing a direction of movement of a barrier being moved by an electric motor, comprising:
    providing a plurality of reversal algorithms for performing barrier movement reversal, the plurality of reversal algorithms comprising at least a first reversal algorithm and a second reversal algorithm which provides more rapid reversal than the first reversal algorithm;
    sensing a request to reverse the direction of movement of the barrier;
    identifying a type of request sensed in the sensing step; and
    performing one of the plurality of reversal algorithms selected in response to the type of request identified in the identifying step.

2. A method in accordance with claim 1 comprising deenergizing the electric motor in response to the sensing step.

3. A method in accordance with claim 2 wherein at least one of said plurality of reversal algorithms comprises energizing the motor for a reversal of barrier movement.

4. A method in accordance with claim 1 wherein the performing step comprises energizing the motor for reversal of barrier motion without substantial delay after the sensing step when the identifying step identifies the request for reversal as a contact type reversal request.

5. A method in accordance with claim 4 comprising continuing to energize the motor for reversal until the barrier movement has slowed to a predetermined rate of movement or until the passage of a first predetermined period of time.

6. A method in accordance with claim 3 wherein the performing step comprises pausing for a second predetermined period of time before energizing the motor for reversal when the identifying step identifies a request for reversal as a non-contact type reversal request.

7. A method in accordance with claim 6 comprising energizing the motor for reversal of barrier movement after the barrier movement has slowed to a predetermined rate of movement or the passage of a third predetermined time.

8. A method in accordance with claim 6 wherein the performing step comprises pausing for a second predetermined period of time then energizing the motor for reversal of barrier movement after barrier movement has slowed to a predetermined rate of movement or the passage of a third predetermined time.

9. A method in accordance with claim 3 wherein the motor is a capacitor start motor and energizing the motor for reversal comprises energizing a start winding of the motor.

10. A method in accordance with claim 1 wherein the step of identifying whether the sensed reversal request is of a contact or a non-contact type.

11. A method in accordance with claim 10 wherein the step of performing the more rapid second reversal algorithm when the sensed reversal request is of a contact type.

12. A method in accordance with claim 11 wherein the step of performing one of the plurality of reversal algorithms comprises performing the less rapid first reversal algorithm when the sensed reversal is of a non-contact type.

* * * * *